(12) United States Patent
Tham et al.

(10) Patent No.: US 8,920,109 B2
(45) Date of Patent: Dec. 30, 2014

(54) VANE CARRIER THERMAL MANAGEMENT ARRANGEMENT AND METHOD FOR CLEARANCE CONTROL

(71) Applicants: Kok-Mun Tham, Oviedo, FL (US); Ching-Pang Lee, Cincinnati, OH (US); Brian H. Terpos, Oviedo, FL (US); Dustan M. Simko, Charlotte, NC (US)

(72) Inventors: Kok-Mun Tham, Oviedo, FL (US); Ching-Pang Lee, Cincinnati, OH (US); Brian H. Terpos, Oviedo, FL (US); Dustan M. Simko, Charlotte, NC (US)

(73) Assignee: Siemens Aktiengesellschaft, München (DE)

( * ) Notice: Subject to any disclaimer, the term of this patent is extended or adjusted under 35 U.S.C. 154(b) by 23 days.

(21) Appl. No.: 13/795,542

(22) Filed: Mar. 12, 2013

(65) Prior Publication Data

US 2014/0271103 A1  Sep. 18, 2014

(51) Int. Cl.
*F01D 25/26* (2006.01)
*F02C 9/16* (2006.01)

(52) U.S. Cl.
CPC .................................. *F02C 9/16* (2013.01)
USPC ........................................ 415/108; 415/175

(58) Field of Classification Search
USPC .................... 415/108, 175, 176, 177, 178
See application file for complete search history.

(56) References Cited

U.S. PATENT DOCUMENTS

| | | | |
|---|---|---|---|
| 1,957,700 | A | 4/1931 | Dahlstrand |
| 1,873,743 | A | 8/1932 | Doran |
| 2,320,398 | A | 6/1943 | Zetterquist |
| 5,205,115 | A | 4/1993 | Plemmons et al. |
| 5,219,268 | A | 6/1993 | Johnson |
| 5,281,085 | A | 1/1994 | Lenahan et al. |
| 5,399,066 | A | 3/1995 | Ritchie et al. |
| 5,605,438 | A | 2/1997 | Burdgick et al. |
| 6,273,675 | B1 | 8/2001 | Magoshi et al. |
| 6,352,404 | B1 | 3/2002 | Czachor et al. |
| 7,037,065 | B2 | 5/2006 | Reigl |
| 7,185,499 | B2 | 3/2007 | Chereau et al. |
| 7,434,402 | B2 | 10/2008 | Paprotna et al. |
| 8,021,109 | B2 | 9/2011 | Kneeland et al. |
| 8,152,446 | B2 | 4/2012 | Zhang et al. |
| 8,210,802 | B2 | 7/2012 | Kneeland et al. |
| 8,240,988 | B2 | 8/2012 | Pang |
| 2009/0004002 | A1 | 1/2009 | Dong et al. |
| 2010/0111679 | A1* | 5/2010 | Black ............................ 415/177 |
| 2011/0135456 | A1 | 6/2011 | Takahashi et al. |
| 2012/0167584 | A1 | 7/2012 | Philippot |

FOREIGN PATENT DOCUMENTS

| | | |
|---|---|---|
| DE | 102008044435 A1 | 2/2009 |
| EP | 2574732 A2 | 8/2012 |
| JP | 61-200310 | 9/1986 |
| JP | 10-196312 | 7/1998 |
| WO | 2013086105 A1 | 6/2013 |

* cited by examiner

*Primary Examiner* — Dwayne J White

(57) ABSTRACT

A thermal management arrangement (110) in a gas turbine engine (60), including: a conduit-arrangement (62) providing fluid communication between a compressor section (156) and: a relatively thermally responsive portion (52) of a turbine vane carrier (10); and a relatively thermally unresponsive portion (48) of a first turbine vane carrier. The conduit-arrangement includes: a general cooling flow outlet (122) disposed proximate the relatively thermally responsive portion of the turbine vane carrier and configured to discharge a general cooling flow (124); and an impingement flow outlet (118) disposed proximate the relatively thermally unresponsive portion and configured to discharge an impingement flow (120). The thermal management arrangement is configured such that a flow rate of the impingement flow is effective to accelerate a thermal response of the relatively thermally unresponsive portion toward a thermal response of the relatively thermally responsive portion.

20 Claims, 7 Drawing Sheets

VANE CARRIER THERMAL MANAGEMENT ARRANGEMENT AND METHOD FOR CLEARANCE CONTROL

FIELD OF THE INVENTION

The invention relates to an apparatus and method for thermal regulation of a turbine vane carrier. In particular, the invention relates to controlling ovalization of the turbine vane carrier via selective application of compressed air from the compressor.

BACKGROUND OF THE INVENTION

Hot gases produced via combustion within a gas turbine engine are directed into a turbine. Energy present in the hot gases is used to turn rows of turbine blades and this generates electrical energy and turns the upstream compressor rotor. In order to increase an efficiency of this energy extraction, rows of turbine vanes are disposed between each of the rows of turbine blades. The turbine vanes within each of these rows properly orient the hot gases passing there through for optimal interaction with the next row of turbine blades.

The turbine blades may be disposed on a central rotor shaft because they turn with the rotor shaft. In contrast, the turbine vanes, which must remain stationary, must be mounted another way. In certain configurations the turbine vanes are mounted on an inner perimeter of a turbine vane carrier ring. The turbine vane carrier ring may, in turn, be mounted to the engine casing. The logistics of assembly and disassembly of the gas turbine engine could permit a one-piece turbine vane carrier. However, for sake of simplicity of maintenance etc. in current practice a two-piece turbine vane carrier is often used. When using the two-piece vane carrier ring, an upper half and a lower have are often joined together by bolting together flanged-ends of each half.

During startup, regular operation, and shutdown, temperatures within the gas turbine engine may vary from steady state operating conditions. These instances are known as transients. Associated with a change in temperature may be a change in dimensions of the component. However, the dimensional changes may not be uniform throughout a volume of the component, resulting in a distortion of a shape of the component during the transients. This phenomenon may control permissible tolerances between parts having relatively different thermal responses. One result is that tolerances might be made larger than would be optimal during steady state conditions so that during transient temperature conditions any thermal growth mismatch will not result in the components interfering with (growing into) each other. For example, a gap between tips of rotating turbine blades and a respective sealing surface, which is disposed on an inner perimeter of ring segments surrounding the turbine blades, must be sized to minimize contact (rubbing) between the tip and the sealing surface and associated blade tip material loss related to thermal growth mismatch. However, this reduces engine performance.

In certain configurations the turbine vane carrier also holds the ring segments. However, the turbine vane carrier and associated structure may have a different thermal response than the turbine blades and associated structure. As a result, the turbine vane carrier must be thermally regulated to control a gap between the tips of the rotating blades and the blade sealing surface. Conventional thermal regulation is known to draw compressed air from the compressor and direct the compressed air to a plenum surrounding the turbine vane carrier. During base load operation this compressed air generally cools the turbine vane carrier, and then passes through the turbine vane carrier and into bases of the turbine vanes, where it cools the turbine vanes prior to exiting into a hot gas path within the turbine.

BRIEF DESCRIPTION OF THE DRAWINGS

The invention is explained in the following description in view of the drawings that show.

DETAILED DESCRIPTION OF THE INVENTION

The present inventors have recognized that when the turbine vane carrier is of split-ring configuration, such that it is formed of two halves bolted together at respective flanges, the mass of the flanges and bolts may be slowing the thermal response of local regions of the vane carrier ring that includes the flanges and bolts when compared to other local regions of the vane carrier ring of relatively lower mass. The present inventors have further recognized that the relatively slow thermal response of these relatively high mass regions may be responsible for ovalization of a turbine vane carrier during transients. This ovalization may, in turn, lead to decreased blade tip clearance, or circumferentially varying blade tip clearances, because the vane carrier may carry the rings segments that form a seal with the blade tips. Consequently, the inventors have recognized that the generalized cooling of the prior art can be improved upon.

The present inventors have devised a clever, yet simple thermal management arrangement that is effective to better control ovalization of the turbine vane ring. The inventive apparatus and method are effective to compensate for the varying mass of the turbine vane carrier by applying flows of compressed air from the compressor to local areas of the turbine vane carrier, where an amount of compressed air and type of cooling (convection or impingement) supplied to each local area is associated with a respective mass and associated thermal response of the local area. An impingement flow is more effective at thermal transfer than convection cooling that is more closely associated with the general cooling flow. As a result, the higher mass flange areas can be selectively regulated to a relatively greater extent than the relatively lower mass other areas by increase a flow rate to that area and/or using more effective impingement cooling in that area. This scheme of localized regulation based on the localized mass enables the thermal growth of local areas of differing mass to be brought more closely together. When the thermal grown of the local areas is more closely matched, i.e. the response of the relatively higher mass (slower responding portion) is accelerated toward a thermal response of the relatively lower mass area (faster responding portion), the thermal growth of the entire turbine vane carrier becomes uniform. Uniform thermal growth of the turbine vane ring mitigates or eliminates ovalization of the turbine vane ring. As a result, blade tip clearances, which are associated with the thermal growth of the turbine vane carrier, remain more uniform. This leads to better clearance control, potentially tighter gaps, and improved engine efficiency.

Figure 1:
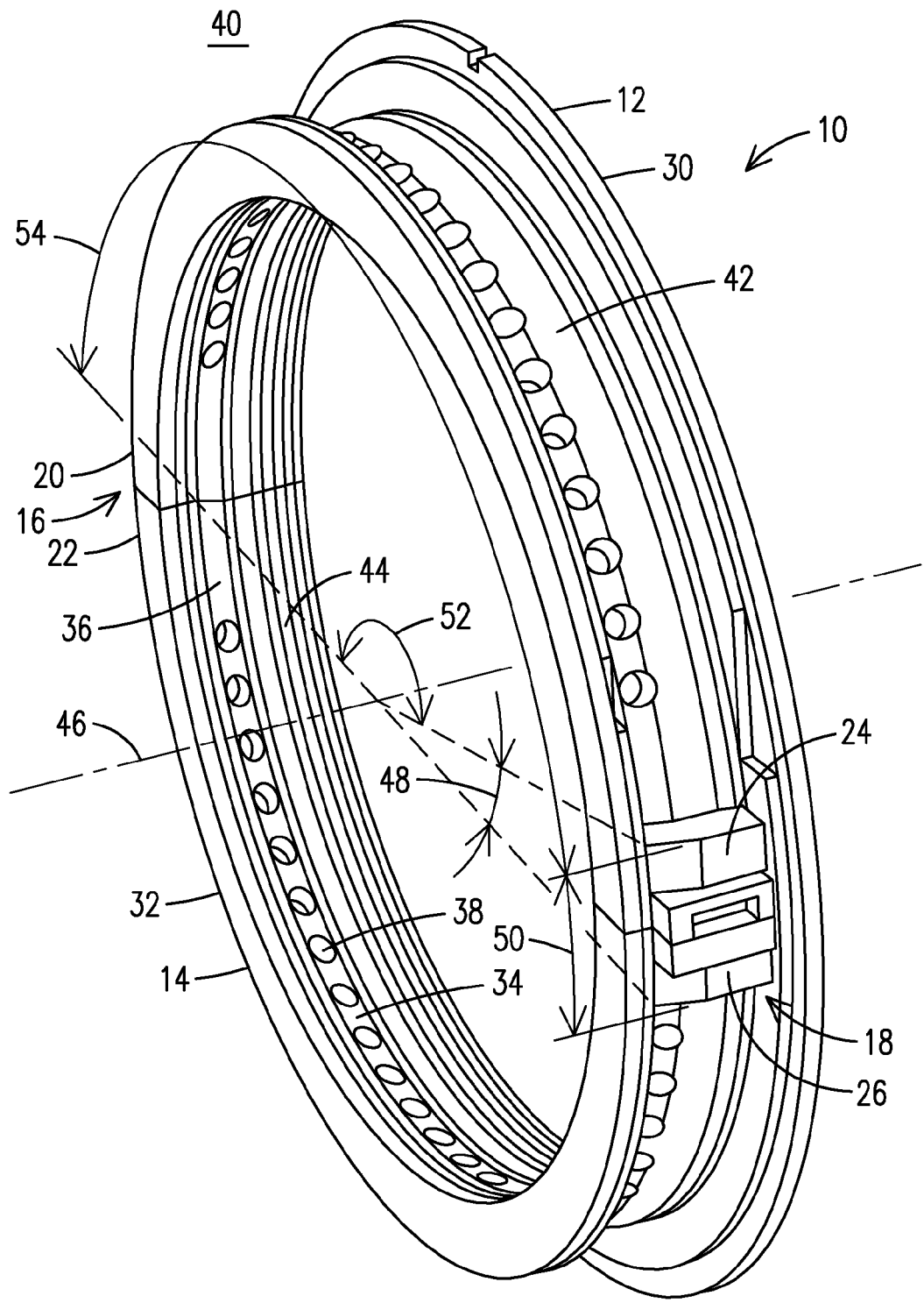
FIG. 1 shows a turbine vane carrier.

FIG. 1 shows a conventional turbine vane carrier 10 having an upper half 12 and a lower half 14 joined at a left horizontal joint 16 and a right horizontal joint 18. The left horizontal joint 16 has a left joint upper flange 20 (not visible), a left joint lower flange 22 (not visible), and a left joint bolt (not shown) joining the left flanges 20, 22. Likewise, the right horizontal joint 18 has a right upper flange 24, a right lower flange 26, and a right bolt (not shown) joining the right flanges 24, 26. The upper half 12 also includes an upper arcuate portion 30 between the upper flanges 20, 24 (excluding the upper flanges 20, 24). The lower half 14 also includes a lower arcuate portion 32 between the lower flanges 22, 26 (excluding the lower flanges 22, 26). The turbine vanes (not shown) are secured to an inner perimeter 34 of the turbine vane carrier 10 at a first axial location 36. Pass-through holes 38 permit cooling air to travel from a plenum 40 surrounding an outer perimeter 42 of the turbine vane carrier 10, through the turbine vane carrier 10, and into bases of the turbine vanes (not shown) that are secured to the inner perimeter 34 of the turbine vane carrier 10. Turbine ring segments (not shown) are also secured to the inner perimeter 34, but at a second axial location 44. From this it can be seen that any ovalization of the turbine vane carrier 10 would result in an ovalization of the ring segments (not shown) mounted to the turbine vane carrier 10. Hence, it can be seen that any ovalization would alter a gap (not shown) between any blade tips (not shown) and the ring segments (not shown).

FIG. 1 also shows a central axis 46 of the turbine vane carrier 10. The right horizontal joint 18 occupies a first circumferential portion 48 of the entire circumference of the turbine vane carrier 10. Thus, the horizontal joint also has a flange arc length 50. The first circumferential portion 48 includes the extra mass of the flanges 24, 26 and the associated bolt (not shown), and so it will be relatively unresponsive. The upper arcuate portion 30 (excluding the upper flanges 20, 24) defines a second circumferential portion 52 of the entire circumference of the turbine vane carrier 10. Thus the second circumferential portion 52 has a second circumferential portion arc length 54. The second circumferential portion 52 excludes the mass of the flanges and bolts, and so it will be relatively thermally responsive when compared to the first circumferential portion 48. In this exemplary embodiment, when added together, the first circumferential portion 48 and the second circumferential portion 52 form half of the turbine vane carrier 10. Stated in different terms, it can be seen that the average mass per unit of arc length in the first circumferential portion 48 is much greater than an average mass per unit of arc length in the second circumferential portion 52 due to the presence of the flanges 24, 26 and the associated bolt (not shown). It is this difference in average mass per unit arc length that results in thermal growth mismatch and associated ovalization of the turbine vane carrier 10, and it is this ovalization the method and structure disclosed herein controls.

The inventive compensation for this phenomenon disclosed herein may be accomplished by selectively controlling the thermal response of the first circumferential portion 48 and the second circumferential portion 52, and this occurs via selective application of compressed air to the respective circumferential portions. The selective application of compressed air permits local and optionally active control of respective thermal responses and associated dimensional changes in the first circumferential portion 48 and the second circumferential portion 52. This control of dimensional changes enables control of ovalization of the turbine vane carrier 10.

Figure 2:
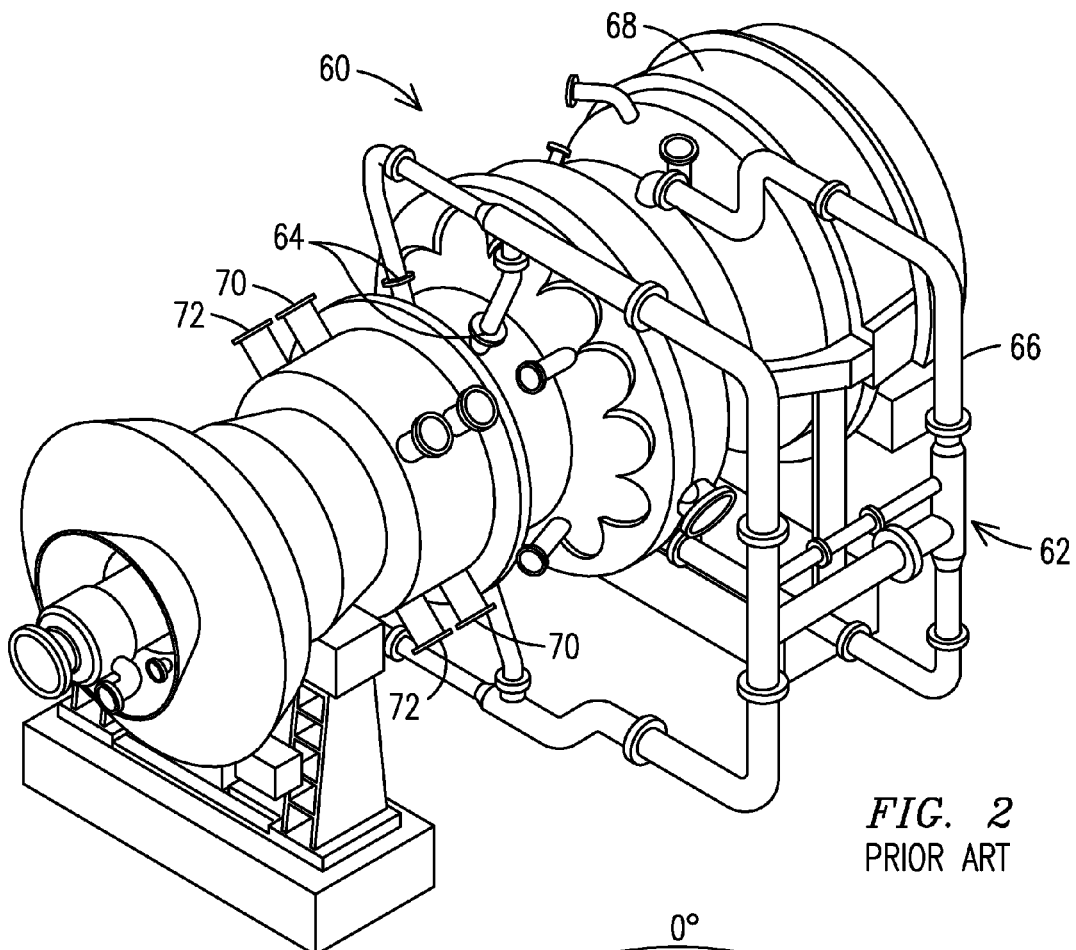
FIG. 2 shows a gas turbine engine prior art generalized cooling arrangement for the turbine vane carrier of FIG. 1.

FIG. 2 shows a gas turbine engine 60 employing a generalized cooling arrangement 62 of the prior art, where first conduit-arrangement compressed air is drawn from at least one first bleed port 64, guided through a first conduit-arrangement 66, and through a turbine casing 68 where it is discharged into the plenum 40 to generally cool as detailed above. Also shown are second bleed ports 70 and third bleed ports 72 that may be used to drive second conduit-arrangement compressed air through a second conduit-arrangement (not shown) and third conduit-arrangement compressed air through a third conduit-arrangement (not shown) respectively, where the second conduit-arrangement compressed air and the third conduit-arrangement compressed air generally cool a second turbine vane carrier (not shown) and a third turbine vane carrier (not shown) respectively. The first turbine vane carrier may be a "turbine vane carrier 2", (a row of turbine vanes upstream of the first row of turbine blades is not addressed in this exemplary embodiment), the second turbine vane carrier may be a "turbine vane carrier 3", and the third turbine vane carrier may be a "turbine vane carrier 4", which are known to those in the art as holding a second row of turbine vanes, a third row of turbine vanes, and a fourth row of turbine vanes respectively.

A pressure of the compressed air that flows out of the first bleed port 64 is greater than a pressure of hot gases flowing within the turbine proximate the first turbine vane carrier. Consequently, the compressed air flows naturally from the compressor to the first turbine vane carrier. Compressed air that flows out of the second bleed port 70 is greater than a pressure of hot gases flowing within the turbine proximate the second turbine vane carrier. Due to expansion within the turbine, the pressure of hot gases flowing within the turbine proximate the second turbine vane carrier is lower than the pressure of the hot gases flowing within the turbine proximate the first turbine vane carrier. As a result, the pressure at the second bleed port 70 can be less than the pressure at the first bleed port 64. For this reason, the second bleed port 70 can be positioned at a location where the pressure is less than the pressure required at the first bleed port 64. Likewise, compressed air that flows out of the third bleed port 72 is greater than a pressure of hot gases flowing within the turbine proximate the third turbine vane carrier, and so a pressure at the third bleed port 72 can be less than the pressure at the second bleed port 70.

As can be seen from the figure, the first conduit-arrangement penetrates the turbine casing 68 typically at the twelve o'clock position and the six o-clock position. Typically, the turbine vane carrier 10 is oriented such that the left horizontal joint 16 is disposed at the nine o'clock position when looking from upstream to downstream, and the right horizontal joint 18 is disposed at the three o'clock position. As such, the generalized cooling air enters the plenum 40 above the upper arcuate portion 30 and although not visible in the figure, the generalized cooling air also enters at the six o'clock position, below the lower arcuate portion 32.

Figure 3:
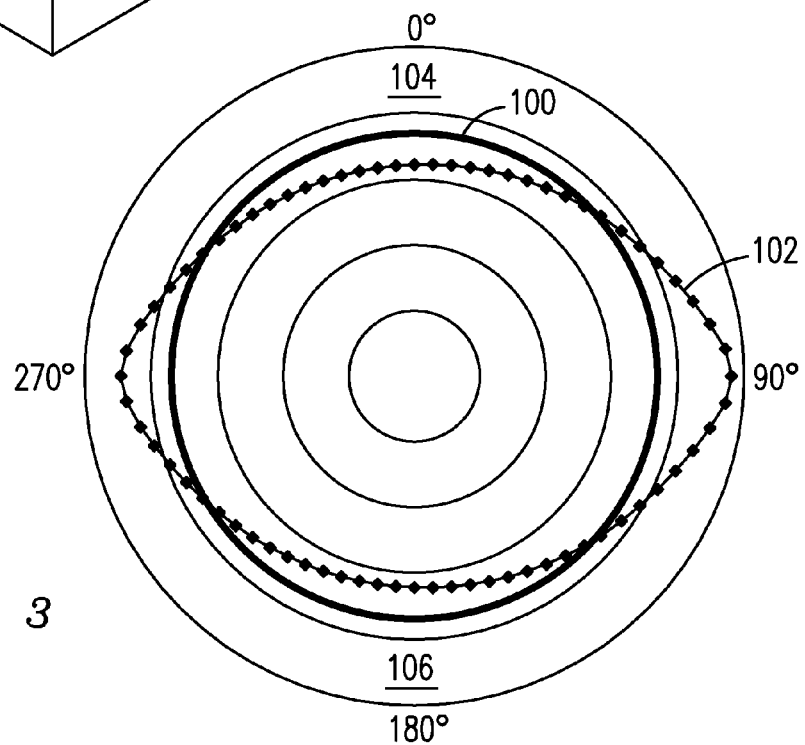
FIG. 3 is a graph representing ovalization of the turbine vane carrier of FIG. 1 that results from the prior art generalized cooling arrangement of FIG. 2.

In configurations like this the generalized cooling air enters the plenum 40 proximate the portions of the turbine vane carrier having the lowest mass, while the portions of the turbine vane carrier having the greatest mass see the least generalized cooling air. FIG. 3 shows an example of the resulting ovalization that occurs in such a configuration. The solid line 100 indicates a mean (a.k.a. preferred) radial displacement of the turbine vane ring, while the dotted line 102 indicates the actual displacement. From this it can be seen that the clearance between the blade tips and the surrounding ring segments would not be uniform, and may result in pinch points at least at the twelve o'clock position 104 and/or the six o'clock position 106.

Figure 4:
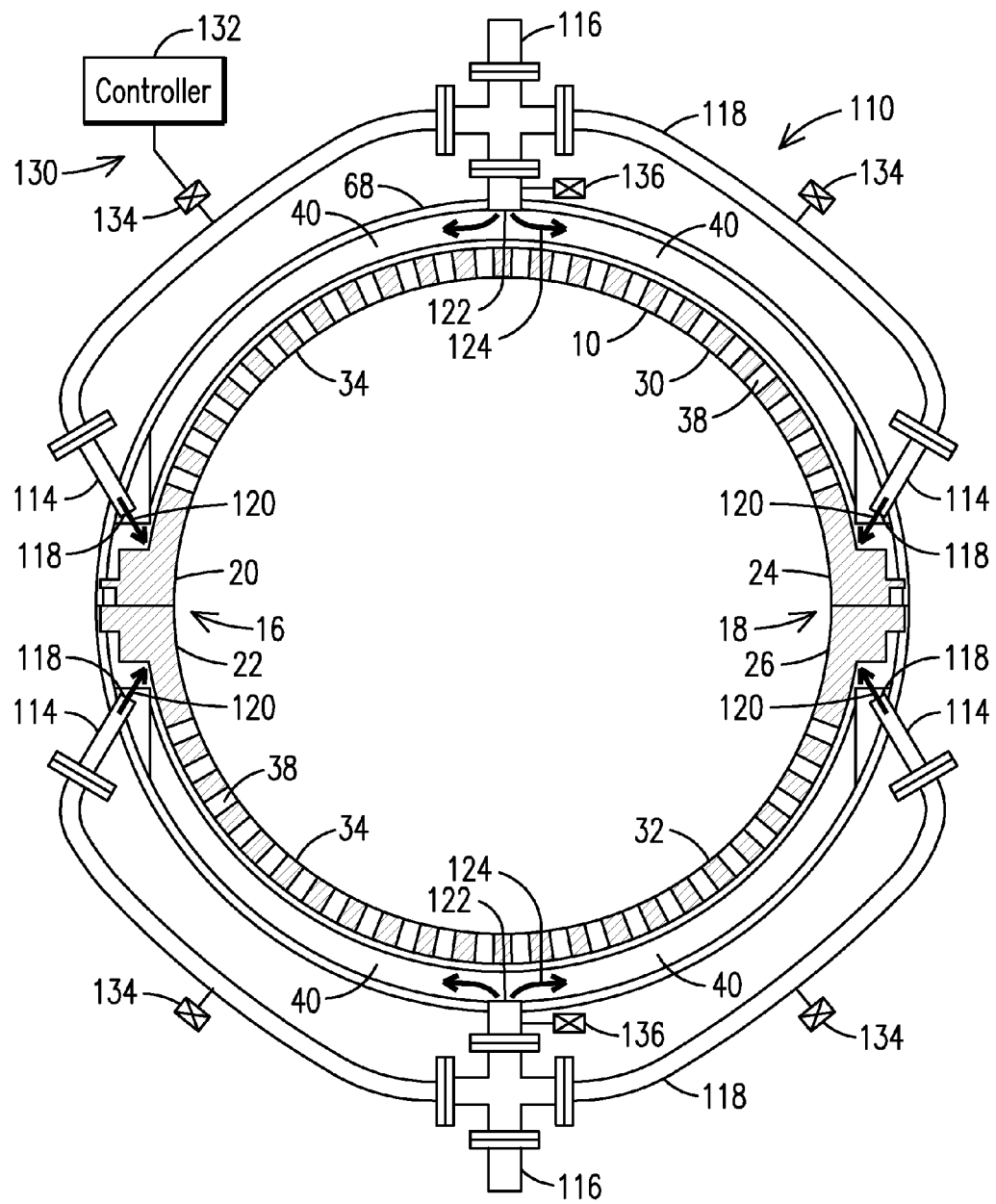
FIG. 4 shows a portion of an exemplary embodiment of the thermal management arrangement disclosed herein.

FIG. 4 shows a portion of one exemplary embodiment of the thermal management arrangement 110 disclosed herein. The turbine vane carrier 10 is disposed within the turbine casing 68 having penetrations 114 there through. The penetrations 114 may be dedicated to passing the first impingement flow through the turbine casing 68. A first conduit-arrangement 116 is in fluid communication with one of the bleed ports of the compressor. The first conduit-arrangement 116 may be plumbed directly and may be free of active, supplemental cooling and/or heating, other than inconsequential thermal change that may naturally occur during transit within the first conduit-arrangement 116. The first conduit-arrangement 116 may have impingement flow outlets 118, each of which directs and impingement flow 120 of compressed air directly onto one of the left horizontal joint 16 and the right horizontal joint 18. The first conduit-arrangement 116 also has general cooling outlets 122, each configured to direct a general cooling flow 124 of compressed air to one of the upper arcuate portion 30 and the lower arcuate portion 32. Pass-through holes 38 permit any compressed air present in the plenum 40 to pass through the turbine vane carrier 10 into turbine vanes (not shown) disposed on the inner perimeter 34 of the turbine vane carrier 10. A vane carrier flow regulation arrangement 130 may include a controller 132, sensors (not shown), individually controllable valves 134 that control a rate of flow of respective impingement flows 120, and individually controllable valves 136 that control a rate of flow of respective general cooling flows 124. This individual control of flow rates may be used to aid control of ovalization.

Figure 5:
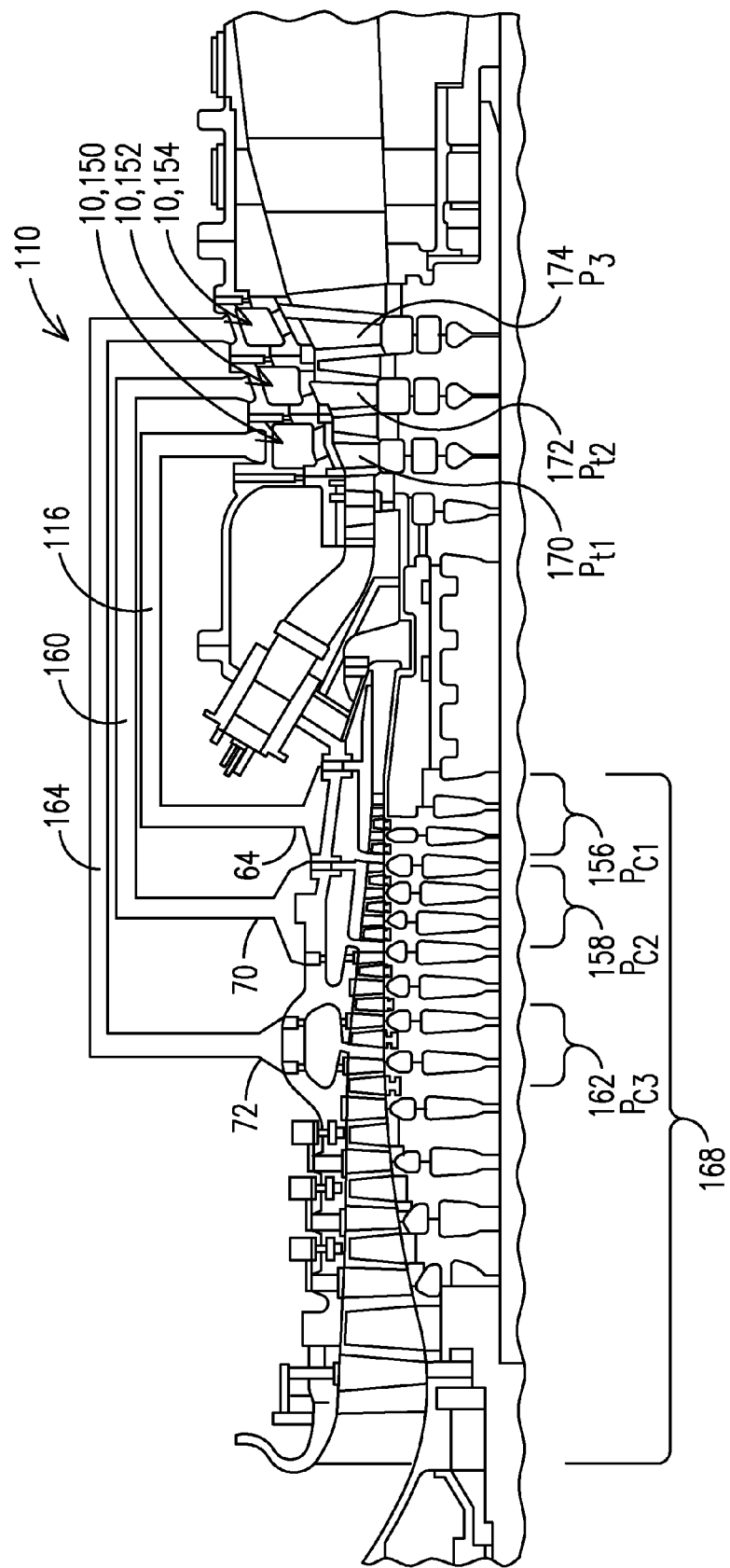
FIG. 5 schematically represents a flow arrangement of an exemplary embodiment of the thermal arrangement disclosed herein.

FIG. 5 shows an exemplary embodiment of the thermal management arrangement 110 that thermally manages three different turbine vane carriers 10, including a turbine vane carrier two 150, a turbine vane carrier three 152, and a turbine vane carrier four 154. The components shown in FIG. 4 that enable the portion of the exemplary embodiment of the thermal management arrangement 110 for one turbine vane carrier 10 would apply to each of the turbine vane carrier two 150, the turbine vane carrier three 152, and the turbine vane carrier four 154. Thus, the turbine vane carrier two 150 may be in fluid communication with a first compressor section 156 via the first conduit-arrangement 116 and the first bleed ports 64. The turbine vane carrier three 152 may be in fluid communication with a second compressor section 158 via a second conduit-arrangement 160 and the second bleed ports 70. The turbine vane carrier four 154 may be in fluid communication with a third compressor section 162 via a third conduit-arrangement 164 and the third bleed ports 72.

Within the first compressor section 156 a first pressure Pc1 is greater than a first pressure Pt1 in the turbine adjacent first turbine section vanes 170 secured to the inner perimeter 34 of the turbine vane carrier two 150. As a result, the first pressure Pc1 drives compressed air from the first compressor section 156, through the first conduit-arrangement 116, out the impingement flow outlets 118, (i.e. first impingement flow outlets in the case of vane carrier two 150) to impinge the flanges 20, 22 of the left horizontal joint 16 and the flanges 24, 26 of the right horizontal joint 18 of the turbine vane carrier two 150 (i.e. first flanges and first horizontal joints). A first pressure difference P1 between the first pressure Pc1 and the first pressure Pt1 is great enough itself to provide impingement cooling without additional impingement orifices when the respective impingement flow outlets 118 are configured properly. As a result, all compressed air needed to thermally regulate turbine vane carrier two 150 can be provided by the compressor 168.

As above, within the second compressor section 158 a second pressure Pc2 is greater than a second pressure Pt2 in the turbine adjacent second turbine section vanes 172. As a result, the second pressure Pc2 drives compressed air from the second compressor section 158, through the second conduit-arrangement 160, out the respective impingement flow outlets 118, (i.e. "second impingement flow outlets" in the case of vane carrier three 152) to impinge the respective flanges 20, 22 of the respective left horizontal joint 16 and the respective flanges 24, 26 of the respective right horizontal joint 18 of the turbine vane carrier three 152, (i.e. "second flanges" and "second horizontal joints"). A second pressure difference P2 between the second pressure Pc2 and the second pressure Pt2 is great enough itself to provide impingement cooling when the respective impingement flow outlets 118 are configured properly. As a result, all compressed air needed to thermally regulate turbine vane carrier three 152 can also be provided by the compressor 168. In addition, the second pressure Pc2 in the second compressor section 158 may be less than the first pressure Pc1 in the first compressor section 156. The second pressure Pt2 in the turbine adjacent second turbine section vanes 172 may be less than a first pressure Pt1 in the turbine adjacent first turbine section vanes 170.

Likewise, within the third compressor section 162 a third pressure Pc3 is greater than a third pressure Pt3 in the turbine adjacent third turbine section turbine vanes 174. As a result, the third pressure Pc3 drives compressed air from the third compressor section 162, through the third conduit-arrangement 164, out the respective impingement flow outlets 118, (i.e. "third impingement flow outlets" in the case of vane carrier four 154) to impinge the respective flanges 20, 22 of the respective left horizontal joint 16 and the respective flanges 24, 26 of the respective right horizontal joint 18 of the turbine vane carrier four 154 (i.e. "third flanges" and "third horizontal joints"). A third pressure difference P3 between the third pressure Pc3 and the third pressure Pt3 is great enough itself to provide impingement cooling when the respective impingement flow outlets 118 are configured properly. As a result, all compressed air needed to thermally regulate turbine vane carrier four 154 can also be provided by the compressor 168. In addition, the third pressure Pc3 in the third compressor section 162 may be less than the second pressure Pc2 in the second compressor section 158. The third pressure Pt3 in the turbine adjacent the third section turbine vanes 174 may be less than the second pressure Pt2 in the turbine adjacent second turbine section vanes 172.

In an alternate exemplary embodiment, any compressor section may be used to feed any of the various turbine vane carriers 150, 152, 154, so long as the pressure difference between the pressure in the compressor section and the pressure in turbine proximate the turbine vanes carried by the turbine vane carrier(s) is sufficient to drive compressed air through the conduit-arrangement from the compressor to the turbine. For example, the first compressor section 156 could be used to supply compressed air to any of the various turbine vane carriers 150, 152, 154. Alternately, the first compressor section 156 could be used to supply compressed air to the turbine vane carrier two 150, and the second compressor section 158 could be used to supply compressed air to the turbine vane carrier three 152, and the turbine vane carrier four 154. However, the arrangement shown in FIG. 5 is advantageous in that the pressure differences, in particular P2 and P3, are closer to threshold pressure differences needed to provide adequate impingement cooling. Using compressed air from, for example, the first compressor section 156 to supply the turbine vane carrier four 154 would result in a much larger pressure difference P3. The much larger pressure difference P3 may be inefficient for engine operation in that more compressor work is done to achieve that pressure difference and/or more impingement air would flow than necessary to adequately thermally manage the turbine vane carrier four 154. Since the impingement air is not used in combustion, using excess impingement air reduces the air available for combustion, thereby reducing the operating efficiency of the engine.

Figure 6:
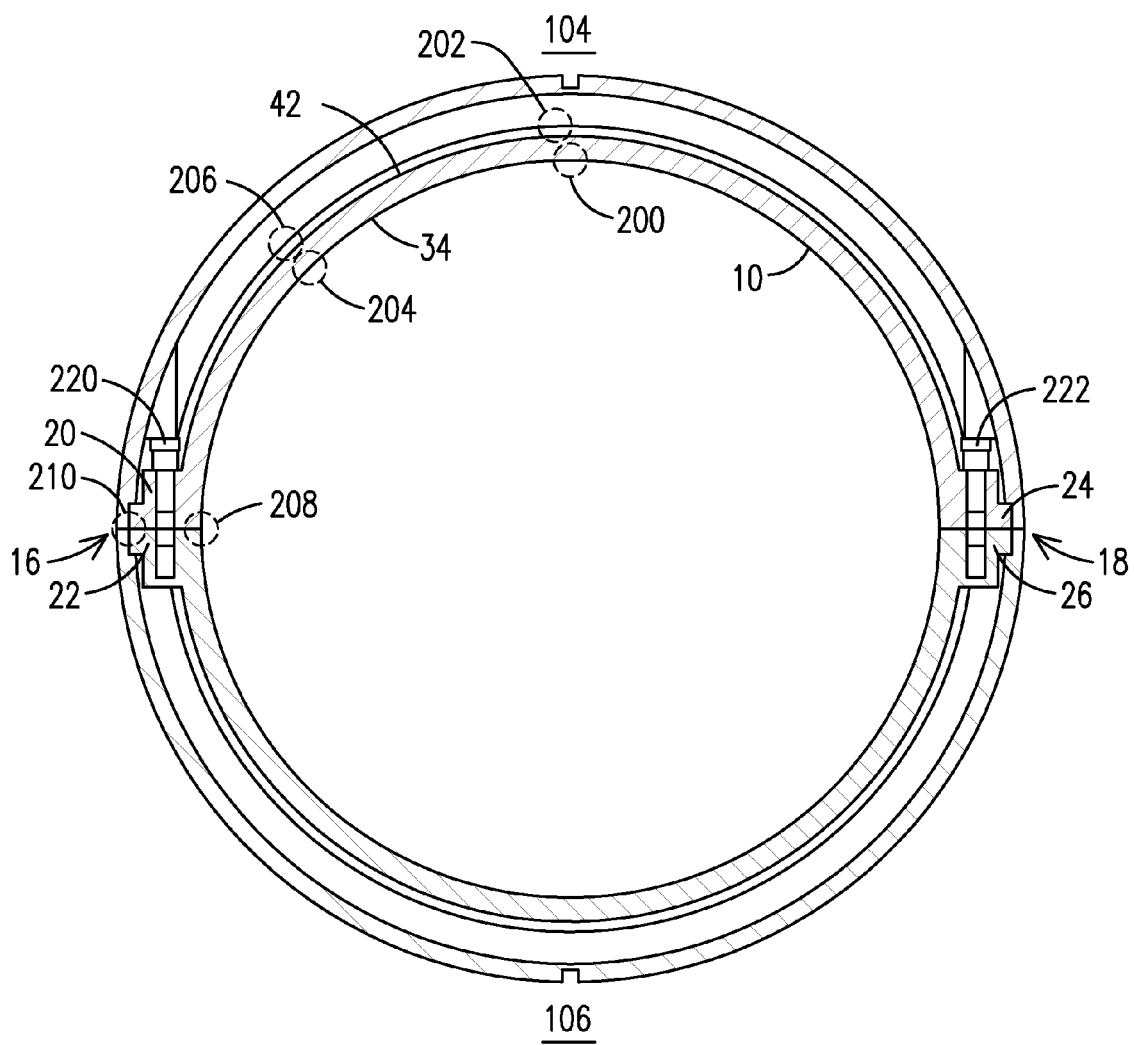
FIG. 6 is a representation of the turbine vane carrier of FIG. 1 with particular locations identified.
Figure 7:
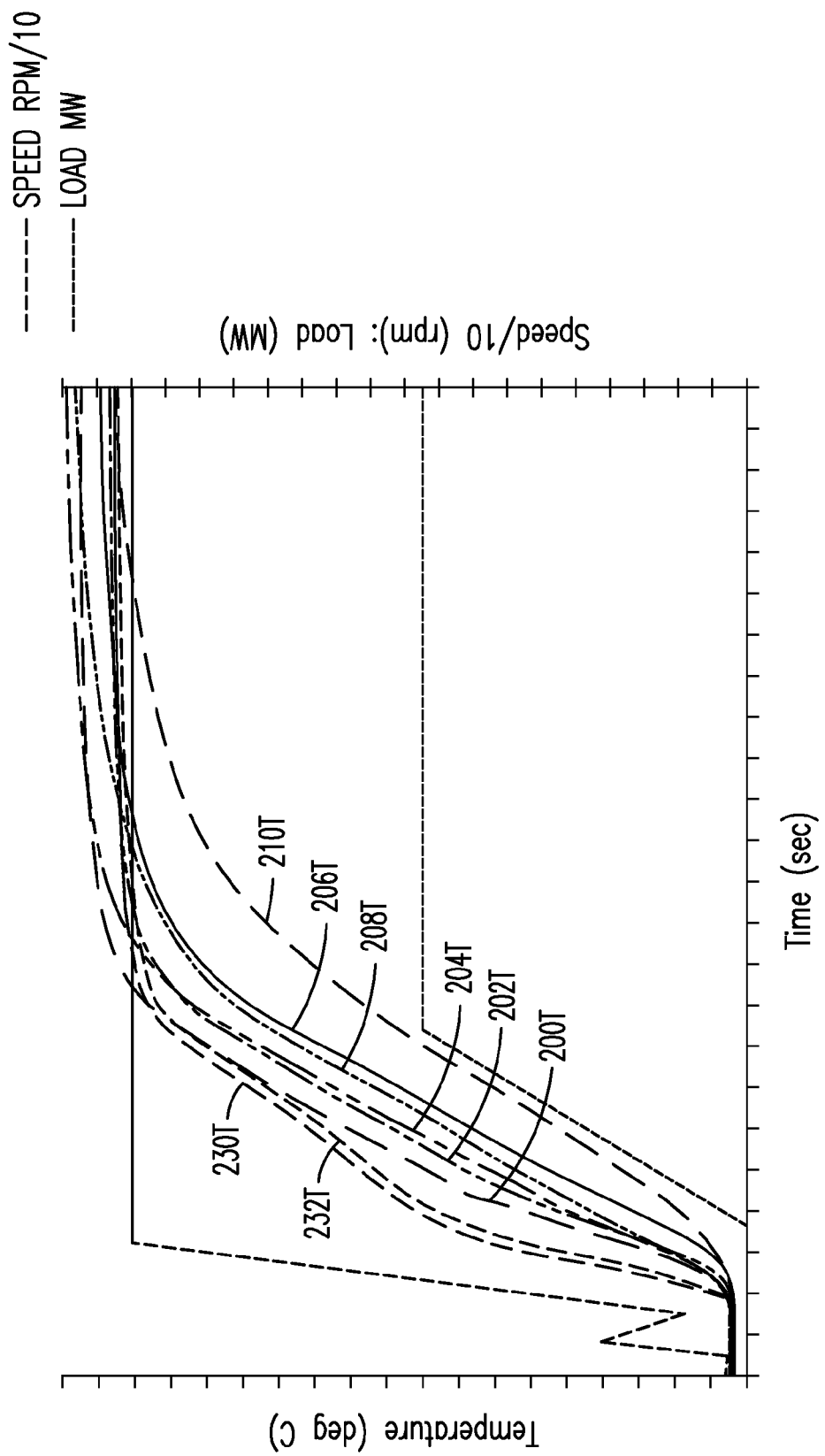
FIG. 7 is a graph showing temperatures of impingement air and of the locations identified in FIG. 6 during startup of the gas turbine engine.
Figure 8:
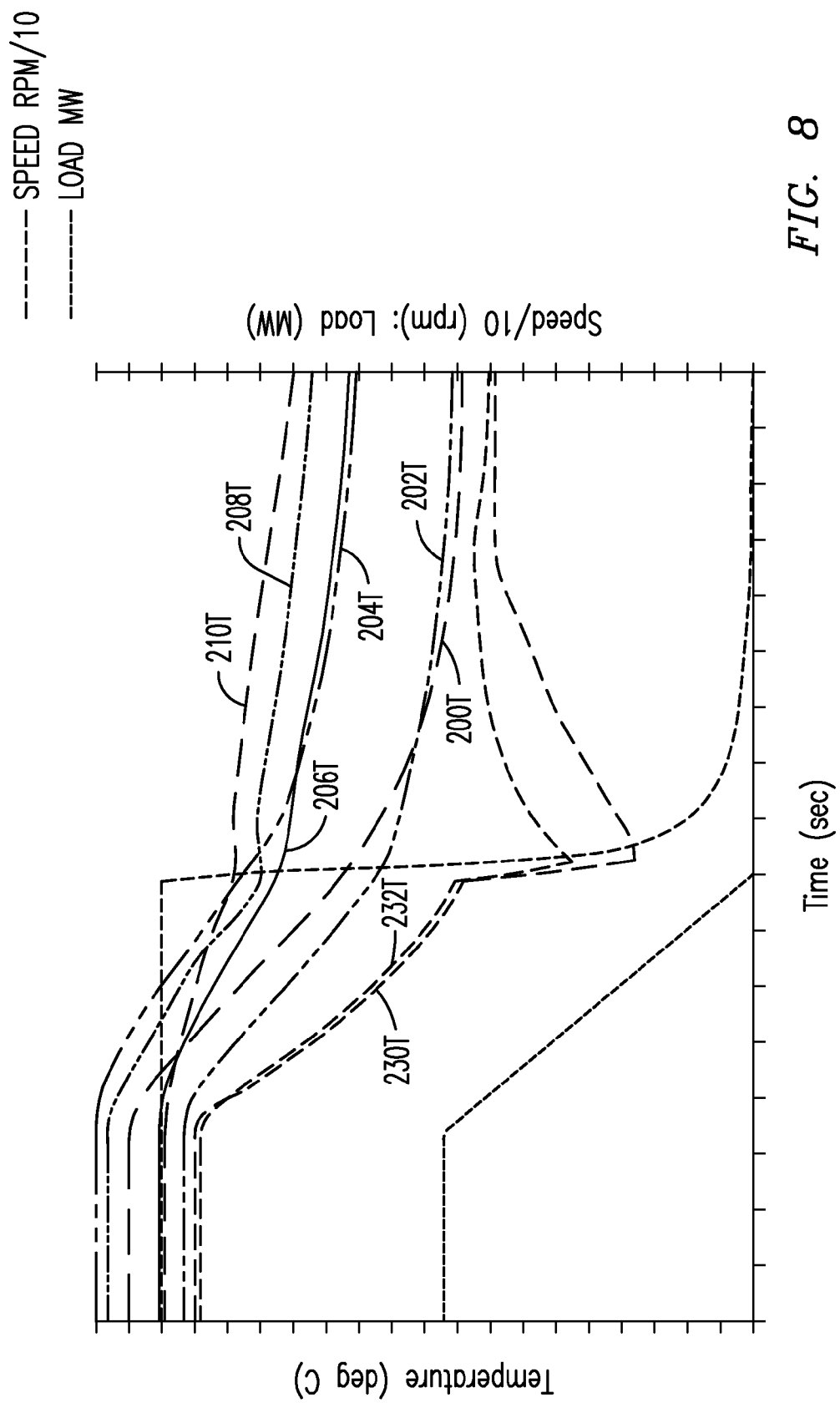
FIG. 8 is a graph showing temperatures of impingement air and of the locations identified in FIG. 6 during shutdown of the gas turbine engine.

FIG. 6 shows the turbine vane carrier 10 with particular locations identified for purposes of the graphs of FIGS. 7 and 8. The turbine vane carrier 10 of FIG. 6 is oriented to correspond with the ovalization shown in FIG. 3. Location 200 is on the inner perimeter 34 near the twelve o'clock position (zero degrees). Location 202 is on the outer perimeter 42 near the twelve o'clock position. Location 204 is on the inner perimeter 34 near the 315 degree (ten thirty) position. Location 206 is on the outer perimeter 42 near the 315 degree (ten thirty) position. Location 208 is on the inner perimeter 34 near the nine o'clock position (270 degrees). Location 210 is on the outer perimeter 42 near the nine o'clock position (270 degrees). When comparing these locations with the ovalization of FIG. 3 it becomes apparent that the mass of the flanges 20, 22 of the left horizontal joint 16 and the flanges 24, 26 of the right horizontal joint 18, as well as the left bolt 220 and the right bolt 222, cause ovalization when not impingement cooled as disclosed herein. Likewise, it becomes clear that the thermal management arrangement 110 can mitigate this ovalization by working to harmonize the thermal response/growth of the relatively high mass areas of the turbine vane carrier 10 with the thermal response/growth of the relatively low mass areas of the turbine vane carrier 10.

FIG. 7 graphs temperature curves 200T, 202T, 204T, 206T, 208T, and 210T associated with each respective location 200-210 of FIG. 6 for the vane carrier two 150. Also visible are a temperature curve 230T of compressed air entering a top (twelve o'clock position) of the plenum 40 surrounding an outer perimeter 42 of the turbine vane carrier 10 during start-up, and a temperature curve 232T of compressed air entering a bottom (six o'clock position) of the plenum 40 surrounding an outer perimeter 42 of the turbine vane carrier 10 also during start-up. From this it can be seen that the compressed air entering the plenum 40 is warmer than the locations 200-210. Consequently, during start-up the compressed air is not acting as cooling air, but is instead acting as a warming air. By adding the impingement flow 120 of compressed air, the relatively warmer compressor air can be tailored to bring additional heat to the relatively slow warming mass of the flanges 20, 22 of the left horizontal joint 16 and the flanges 24, 26 of the right horizontal joint 18, as well as the left bolt 220 and the right bolt 222, represented by locations 208 and 210, to match the higher temperature and associated higher thermal growth of the lower mass sections, represented at least by locations 200 and 202.

Once the engine approaches a steady state operating condition, shown toward the right end of the graph, the temperature curves 200T-210T of locations 200-210 approach uniformity, and exceed the temperatures of the compressed air entering a top and the bottom of the plenum 40. This occurs because the combustion gases flowing in the turbine are significantly hotter than the temperatures of the compressed air entering a top and the bottom of the plenum 40, and so the combustion gases heat the locations 200-210. As a result, during steady state operation the compressed air naturally transition to acting as a cooling medium.

FIG. 8 also graphs the temperatures curves 200T-210T graphed in FIG. 7, but during shut-down procedures. During shut-down, the phenomenon that occurred during start-up occurs in reverse. The temperatures of the compressed air entering the plenum 40 remain cooler than the temperatures associated with locations 200-210. By adding the impingement flow 120 of compressed air, the relatively cooler compressed air can be tailored to further cool the relatively slow cooling mass of the flanges 20, 22 of the left horizontal joint 16 and the flanges 24, 26 of the right horizontal joint 18, as well as the left bolt 220 and the right bolt 222, represented by locations 208 and 210, to match the cooler temperature and associated greater thermal shrinkage of the lower mass sections, represented at least by locations 200 and 202.

As can be seen from FIGS. 7 and 8, since the compressed air naturally heats during start-up, and naturally cools during steady state operation as well as during shut down, and because these are the exact characteristics desired of the impingement flow 120, the compressed air can be used without supplemental cooling or heating.

The principles and structure applicable the turbine vane carriers 10 are equally applicable to compressor vane carriers that may have a similar flanged assembly arrangement, or otherwise have portions having different thermal responses/ average mass per unit arc length. Impingement flow rates may simply be adjusted to match the thermal management requirements.

The innovative thermal management arrangement and method utilize the nature of existing working fluids to effect the ovalization control, using limited additional hardware, and hence limited additional capital and manpower investment. The decreased ovalization allows for greater tolerance control, and this may lead to reduced interferences (tip rubbing) and improved engine performance. For the foregoing, the thermal management arrangement and method represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A thermal management arrangement in a gas turbine engine, comprising:
 a conduit-arrangement providing fluid communication between a compressor section and: a relatively thermally responsive portion of a turbine vane carrier; and a relatively thermally unresponsive portion of the turbine vane carrier, the conduit-arrangement comprising:
  a general cooling flow outlet disposed proximate the relatively thermally responsive portion of the turbine vane carrier and configured to discharge a general cooling flow; and
  an impingement flow outlet disposed proximate the relatively thermally unresponsive portion and configured to discharge an impingement flow onto the relatively thermally unresponsive portion;
 wherein the thermal management arrangement is configured such that a flow rate of the impingement flow is effective to accelerate a thermal response of the relatively thermally unresponsive portion toward a thermal response of the relatively thermally responsive portion and wherein the turbine vane carrier comprises a discrete ring disposed within an outer casing of the gas turbine engine and comprising the relatively thermally responsive portion and the relatively thermally unresponsive portion.

2. The thermal management arrangement of claim 1, wherein the impingement flow is free of active supplemental heating and cooling.

3. The thermal management arrangement of claim 1, further comprising a turbine vane carrier flow regulation arrangement configured to actively control an impingement flow rate and a general cooling flow rate.

4. A thermal management arrangement in a gas turbine engine, comprising:
   a first conduit-arrangement providing fluid communication between a first compressor section and a first turbine vane carrier flange, the first conduit-arrangement comprising a first impingement flow outlet disposed proximate the first turbine vane carrier flange, and
   a first turbine vane carrier comprising a discrete first ring disposed within an outer casing of the gas turbine engine, the first ring comprising the first turbine vane carrier flange,
   wherein a first pressure in the first compressor section drives a first impingement flow of compressed air through the first conduit-arrangement and wherein the first impingement flow impinges the first turbine vane carrier flange directly after the first impingement flow exits the first impingement flow outlet.

5. The thermal management arrangement of claim 4, wherein after impinging the first turbine vane carrier flange the first impingement flow flows into a flow of hot gases flowing through a turbine comprising the first turbine vane carrier flange.

6. The thermal management arrangement of claim 4, further comprising a first turbine vane carrier flow regulation arrangement configured to control a rate of flow of the first impingement flow.

7. The thermal management arrangement of claim 4, the first conduit-arrangement further comprising a first general cooling outlet configured to deliver a first general cooling flow of compressed air to the first ring, wherein the first general cooling flow is delivered to a second portion of the first ring having a different average mass per unit arc length than a first portion of the first ring comprising the first turbine vane carrier flange,
   wherein the thermal management arrangement is configured such that relative flow rates of the first impingement flow and the first general cooling flow are correlated to the respective thermal responses of the first portion and the second portion.

8. The thermal management arrangement of claim 7, further comprising a first turbine vane carrier flow regulation arrangement configured to actively control the relative flow rates of the first impingement flow and the first general cooling flow.

9. The thermal management arrangement of claim 4, wherein the first impingement flow is free of active supplemental heating and cooling.

10. The thermal management arrangement of claim 4, further comprising:
    a second conduit-arrangement providing fluid communication between a second compressor section and a second turbine vane carrier flange, the second conduit-arrangement comprising a second impingement flow outlet disposed proximate the second turbine vane carrier flange, wherein a second pressure in the second compressor section drives a second impingement flow of compressed air through the second conduit-arrangement, wherein the second pressure is less than the first pressure, wherein the second impingement flow impinges the second turbine vane carrier flange, and wherein the second turbine vane carrier comprises a discrete second ring within the outer casing, the second ring comprising the second turbine vane carrier flange.

11. The thermal management arrangement of claim 10, the second conduit-arrangement further comprising a second general cooling outlet configured to deliver a second general cooling flow of compressed air to the second ring, wherein the second general cooling flow is delivered to a second portion of the second ring having a different average mass per unit arc length than a first portion of the second ring comprising the second turbine vane carrier flange,
    wherein the thermal management arrangement is configured such that relative flow rates of the second impingement flow and the second general cooling flow are correlated to the respective thermal responses of the first portion and the second portion.

12. The thermal management arrangement of claim 11, further comprising a second turbine vane carrier flow regulation arrangement configured to actively control the relative flow rates of the second impingement flow and the second general cooling flow.

13. A method of thermally managing a gas turbine engine, comprising:
    establishing fluid communication between a first location in a compressor and a first turbine vane carrier via a first conduit-arrangement;
    utilizing a greater pressure at the first location to drive a first impingement flow of compressed air from the first location to the first turbine vane carrier;
    impinging a first circumferential portion of the first turbine vane carrier with the first impingement flow directly after the first impingement flow exits an impingement flow outlet of the first conduit-arrangement, and
    controlling an ovalization of the first turbine vane carrier by matching a thermal response of the first circumferential portion of the first turbine vane carrier with a second thermal response of a second circumferential portion of the first turbine vane carrier, wherein the first circumferential portion and the second circumferential portion comprise a different average mass per unit arc length,
    wherein the first turbine vane carrier comprises a discrete ring disposed within an outer casing of the gas turbine engine, the discrete ring comprising the first circumferential portion and the second circumferential portion.

14. The method of claim 13, further comprising utilizing the greater pressure at the first location to drive a first general cooling flow of compressed air to the second circumferential portion of the first turbine vane carrier.

15. The method of claim 14, further comprising regulating independently a rate of flow of the first impingement flow and a rate of flow of the first general cooling flow, effective to control the ovalization of the first turbine vane carrier.

16. The method of claim 15, wherein the rate of flow of the first impingement flow and the rate of flow of the first general cooling flow are actively regulated.

17. The method of claim 13, further comprising guiding the first impingement flow into a flow of hot gases in a turbine comprising the first turbine vane carrier after the first impingement flow impinges the first circumferential portion of the first turbine vane carrier.

18. The method of claim 13, wherein the fluid communication occurs without active, supplemental heating or cooling of the first impingement flow.

19. The method of claim 13, further comprising heating the first circumferential portion of the first turbine vane carrier during startup of the gas turbine engine using the first impingement flow.

20. The method of claim 13, further comprising cooling the first circumferential portion of the first turbine vane carrier during shutdown of the gas turbine engine using the first impingement flow.

* * * * *